(12) United States Patent
Edwards et al.

(10) Patent No.: US 6,272,019 B1
(45) Date of Patent: Aug. 7, 2001

(54) CLOSELY-POSITIONED MULTIPLE GBIC CONNECTORS

(75) Inventors: William F. Edwards, Livermore; Frederick Roland Schindler, Sunnyvale; Robert Gregory Twiss, Portola Valley, all of CA (US)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 09/330,434

(22) Filed: Jun. 11, 1999

(51) Int. Cl.[7] .................................................. H05K 7/02
(52) U.S. Cl. .................... 361/760; 361/730; 361/808; 361/809; 361/829; 361/810; 439/79; 385/92
(58) Field of Search ..................... 361/728–731, 361/807–810, 825, 829, 760; 439/59, 79; 385/88, 89, 92, 94

(56) References Cited

U.S. PATENT DOCUMENTS

| | | | |
|---|---|---|---|
| 5,123,859 | 6/1992 | Davis et al. | 439/405 |
| 5,222,168 | 6/1993 | Saito et al. | 385/59 |
| 5,716,221 | 2/1998 | Kantner | 439/64 |
| 5,757,998 | * 5/1998 | Thatcher et al. | 385/89 |
| 5,767,999 | * 6/1998 | Kayner | 359/163 |
| 5,809,328 | 9/1998 | Nogales et al. | 710/5 |
| 5,879,173 | * 3/1999 | Poplawski et al. | 385/92 |
| 5,901,263 | * 5/1999 | Gaio et al. | 385/92 |
| 5,993,224 | * 11/1999 | Quillet et al. | 439/79 |
| 6,047,172 | * 4/2000 | Babineau et al. | 455/300 |
| 6,074,228 | * 6/2000 | Berg et al. | 385/75 |
| 6,108,198 | * 8/2000 | Lin | 361/730 |
| 6,115,263 | * 9/2000 | Babineau et al. | 361/825 |

* cited by examiner

Primary Examiner—Jayprakash N. Gandhi
Assistant Examiner—John B. Vigushin
(74) Attorney, Agent, or Firm—Sheridan Ross P.C.

(57) ABSTRACT

GBIC frames are mounted with respect to one or another or with respect to the printed circuit board so as to facilitate space sufficiency, e.g. of a front or other panel. In one aspect two GBIC frames are mounted in back-to-back fashion on opposite surfaces of a mounting plate of preferably minimal thickness. Plate cut-outs are positioned to accommodate frame feet or other mounting structures in a fashion off-set, on opposite faces, to avoid interference between frame legs. In one aspect, portions of GBICs and frames are received in cut-out or other edges of a PCB so that GBICs in frames straddle a major surface of a PCB to reduce height for accommodating 1RU or other form factors while increasing space efficiency.

32 Claims, 5 Drawing Sheets

CLOSELY-POSITIONED MULTIPLE GBIC CONNECTORS

Cross-reference is made to U.S. patent application Ser. No. 09/321,066, of MacKay, filed May 27, 1999 for "DISTRIBUTED NETWORK REPEATER SYSTEM"; U.S. patent application Ser. No. 09/330,478, of MacKay, Parameswaran, Twiss and Covaro for "CABLE DETECT AND EMI REDUCTION APPARATUS AND METHOD", filed on even date herewith; U.S. patent application Ser. No. 09/330,733, of Dejager, Chen, Sinha, MacKay Parameswaran, and Twiss for "DISTRIBUTED NETWORK REPEATER MODULE AND METHOD", filed on even date herewith; and U.S. patent application Ser. No. 20/106, 266, for "REPEATER MODULE" of Steve Huang, Robert Gregory Twiss, Van Van Nguyen, and Ken Wood, filed on even date herewith, all incorporated herein by reference.

The present invention relates to a method and apparatus for providing two or more gigabit interface converter (GBIC) connectors which are relatively closely spaced and in particular to providing multiple GBIC connectors to achieve efficient use of a panel area or other region.

BACKGROUND INFORMATION

Numerous types of connectors for providing coupling to cables, fiber optic lines, or other communication media are used in various electronic devices including network devices such as network routers, switches, bridges, gateways and the like. As needs for communication links and/or connectors having various characteristics arise, different connector configurations give rise to standards defining the shape and size of the connectors or their components. One such type of connector is termed a gigabit interface converter (GBIC). In accordance with published or defacto standards, the GBIC includes a face region generally rectangular in shape, and having a size of approximately 1.2 inches by 0.3 inches (about 3 cm by 0.75 cm). This face region represents the region to which users typically will need or want to have access, such as for making connections. Accordingly, when a GBIC is to be part of an apparatus, such as a network router, the GBIC is positioned in the router such that the GBIC face region is accessible to the user. Typically this involves positioning in a portion of an accessible surface of the router cabinet such as preferably, the face plate of the router cabinet.

A number of published and/or de facto standards have emerged to define preferred shapes and sizes for many electronic components such as network routers. For example, particularly when a router is to be compatible with rack-mounting, it is desirable to provide the router cabinet with a face plate having a size of about 1¾ inches by about 17½ inches (about 4.5 cm by about 45 cm). Such a size is compatible with the so-called 1RU form factor. When the face panel (or other surface) of an electronic device, such as a router, needs to have numerous components, such as numerous connectors, signal lights or other displays, switches and the like, it becomes important to make efficient use of the available surface area of the front panel (or other surface), particularly when it is desired for the front panel to be sized and shaped in accordance with the RU form factor or other published or de facto standard (which limits the surface area available for such components). Accordingly, when a network router or other electronic component is to be provided with two or more GBICs, it would be useful to provide for mounting of the GBICs in a fashion which is achieves space efficiency of the face plates with respect to the two or more GBIC connectors.

When GBICs are mounted using GBIC frames for holding the GBICs, there are numerous costs and other advantages to employing GBIC frames which correspond to published or de facto GBIC frame standards. Accordingly, it would be useful to provide for mounting of two or more GBIC frames in a space-efficient manner substantially without requiring modification of a standard GBIC frame configuration.

As GBIC designs have emerged, GBIC frames typically, are configured to accommodate a single GBIC and to accommodate mounting on or with respect to a circuitry component which is a printed circuit board (PCB), with a separate mounting device provided for each GBIC. It is believed that, in general, standard GBIC frame designs were developed at time periods when a single GBIC per router was considered adequate. Current systems, however, make it increasingly useful to provide two or more GBICs in a router. Accordingly, it would be useful to provide a method and apparatus for mounting multiple GBICs preferably using substantially standard GBIC frames, in a manner which is space-efficient.

Achieving closely-spaced mounting of two or more GBICs places constraints on the amount of volume defined between the GBICs (or otherwise in the vicinity of the GBICs). However, in a typical application, certain electronic components such as serializer-deserializer ("SerDes") chips, should preferably be positioned relatively close to the GBICs such as within about 2 inches (5 cm), more preferably, about 1 inch (about 2.5 cm) or less.

In some designs, short signal paths can be difficult to implement. For example, relatively long signal paths may be necessary when such components are positioned on a PCB which is separate from the PCB to which the GBIC is mounted or otherwise directly coupled. Accordingly, it would be useful to provide a method and apparatus for mounting two or more GBICs in a space-efficient fashion while permitting the coupling of SerDes chips, or other electronic components to the GBICs with signal paths less than about 2 inches (about 5 cm).

In addition to the electrical connection between the GBIC and one or more PCBs or other circuit components, the integrity of the mechanical coupling between the GBIC and associated PCBs can be of importance in maintaining the desired electrical connections, especially in the face of jostling or movement that can result as cables, fiber optics and the like are engaged or disengaged with the device. Accordingly, it would be useful to provide a method and apparatus for mounting two or more GBICs which achieves or enhances the mechanical support of the GBIC e.g. with respect to a PCB or other component.

In a typical configuration, a GBIC connector is mounted substantially directly on one or another surface of a PCB board (such as a "motherboard"). Typically, the motherboard will be positioned along the long axis of the chassis and with the plane of the motherboard perpendicular to the plane of the faceplate. In some configurations, a GBIC is mounted with the long axis of its face parallel to the plane of the motherboard (i.e. with the long axis of the GBIC face parallel to the long axis of the chassis faceplate). This provides a relatively favorable height requirement in the sense that such a configuration can readily be contained within the 1.75 inch (about 44.5 mm), maximum height of an RU form factor faceplate. however, this means each GBIC will occupy at least about 1.44 inches (about 3.5 cm) out of the maximum 17.5 inch (about 44.5 cm) lateral space available for the RU form factor, thus limiting the number of GBICs that can be mounted with respect to an RU face plate.

Of course, the amount of lateral dimension occupied by GBIC connectors can be reduced by mounting the GBICs with the long axis of the GBIC face perpendicular to the long axis of the faceplate (and thus, typically perpendicular to the motherboard). Unfortunately, it proves infeasible to accommodate the full height of a GBIC connector plus the thickness of the motherboard plus an allowance for airspace, cabinet wall thickness and like, within an RU height form factor (i.e. 1.75 inches or about 44.5 cm). Accordingly, it would be useful to provide a configuration for mounting a GBIC connector with respect to a circuit board which permits the GBIC to have the long axis of the GBIC face perpendicular to the long axis of the RU face plate, yet still configure the router or other device within an RU height form factor of about 1.75 inches (about 44.5 mm).

SUMMARY OF THE INVENTION

The present invention includes the recognition of problems that arise in going from an apparatus or system having a single GBIC connector to one which has two or more GBIC connectors. In one aspect, the present invention includes providing an attachment plate configured to receive and/or accommodate two GBIC frames which are positioned in back-to-back fashion (i.e. with corresponding surfaces facing each other). This results in a configuration in which the frames are in a mirror-image ("back-to-back") configuration with respect to one another about a plane passing tlirough the attachment plate. Preferably the attachment plate itself is also mirror-symmetric about a plane passing through its midline. In one embodiment the attachment plate is electrically and/or mechanically (preferably both) coupled to a PCB. By coupling an edge of the attachment plate to the PCB, preferably with the symmetry plane substantially perpendicular to the PCB, the proximity of the frames to the PCB is sufficient that SerDes device, or similar electronic component mounted on the PCB can define a signal path less than about 2 inches (about 5 cm). In one embodiment, in addition to mechanical mounting or coupling of the attachment plate to the PCB, one or more of the GBIC frames are also directly mechanically linked to the PCB to provide enhanced structural integrity.

In one aspect, the present invention includes positioning a GBIC with respect to a PCB such that the GBIC is not located entirely on one side of a major surface of the PCB. In one embodiment, the PCB includes a slot or edge for receiving or coupling to one or preferably two or more GBICs so that one portion of the GBICs are positioned one side of a major surface of the PCB and another portion are positioned on the opposite side of the major surface of the PCB. Preferably the GBIC is mounted such that one portion extends upwardly above an upper surface of the PCB and another portion extends downwardly below the lower surface of the PCB.

DETAILED DESCRIPTION

Figure 1:
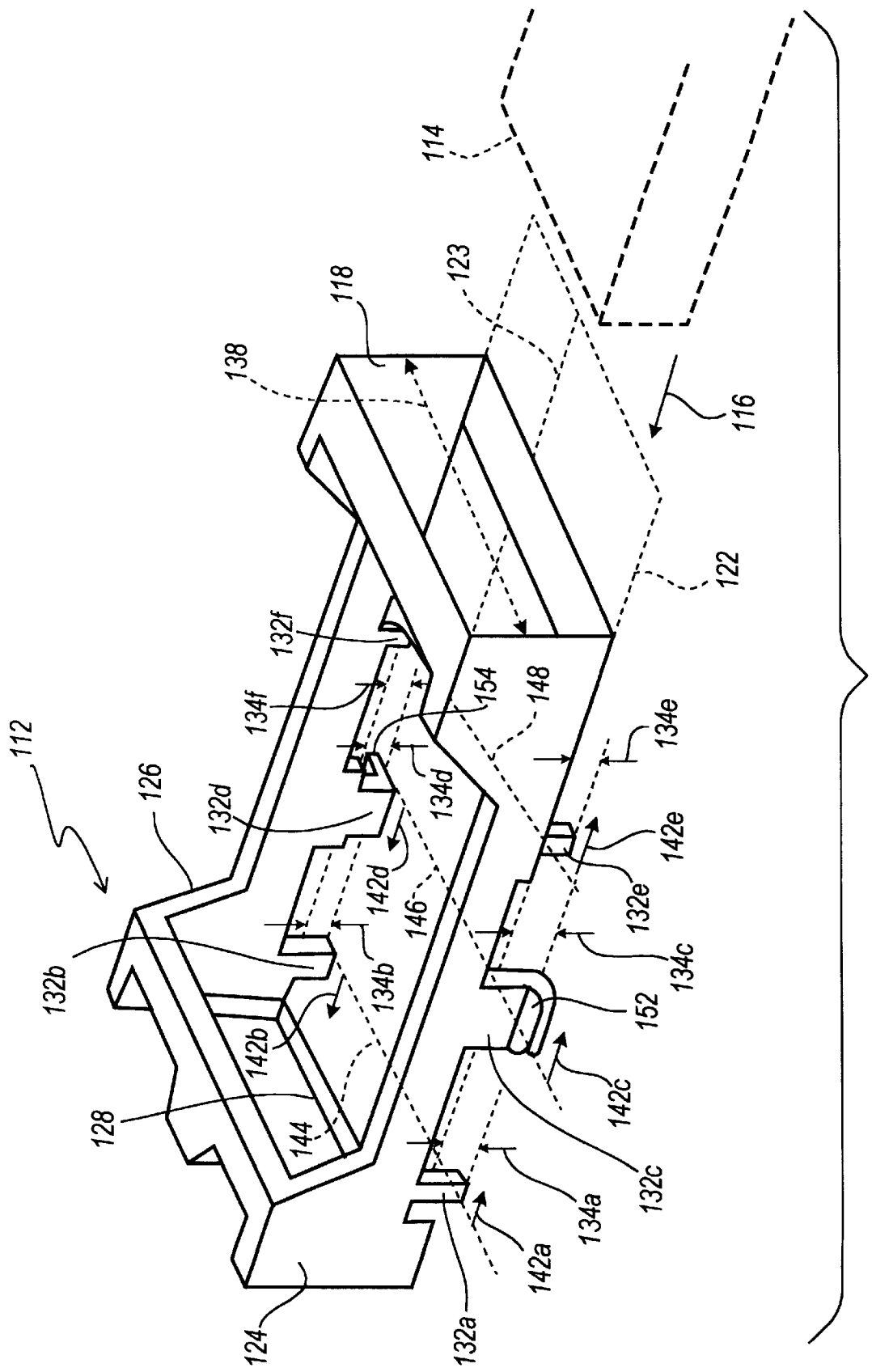
FIG. 1 is a perspective view of a GBIC frame.

As shown in FIG. 1, a GBIC frame 112 is configured to receive a GBIC 114 by insertion 116 through a substantially rectangular front opening or face 118 of the frame. Each of the GBIC frames 112 can be formed of a number of materials such as resins, plastics, fiber reinforced materials. and the like. The bottom surface of the front opening 118 defines a first plane 122 of the frame having a mid-line 123. The frame 112, in the depicted configuration, includes first and second sidewalls 124, 126 extending between the front opening 118 and a rear opening 128. The GBIC frame 112, with the exception of the downwardly extending portions of frame feet, described below, generally fits within a rectangular parallelepiped volume (of which one surface is the plane 122). The frame 112 in the configuration depicted in FIG. 1, includes six foot structures 132a,b,c,d,e,f extending downward distances 134a,b,c,d,e,f from the plane 122. In some previous approaches, the GBIC frame 112 is positioned on a PCB with the plane 122 co-planar with a major surface of the PCB and the feet 132a–f extending thiough recesses or holes formed in the PCB. Such a configuration means that the major axis 138 of the opening 118 is parallel to the plane 122 of the PCB. If, as would be commonly the case in such configuration, the PCB is positioned parallel to the long axis of the front cover of the router or other device, only a relatively few GBICs can be positioned on the front plate, i.e. the GBIC opening occupies a relatively wide longitudinal extend 138 of the front panel.

In the depicted configuration, the feet extending from opposite sidewalls are longitudinally off-set from one another. For example, foot 132a extends forward 142a of a lateral line 144 (which is perpendicular to the mid-line 123) while a corresponding foot 132b extending from the opposite sidewall 126 extends rearward 142b from the lateral line 144. Similarly, foot 132c extends forward 142c of lateral line 146 while foot 132d extends rearward 142d of foot 132d. Foot 132e extends forward 142e of lateral line 148 while foot 132f extends rearward of line 148.

According to one embodiment of the invention, GBIC frames are coupled to opposite sides of a connector plate 212 (FIG. 2) so that two GBICs can be positioned in a relatively close proximity to one another, in back-to-back fashion. The plate 212 can be formed of a number of materials, including fiberglass materials, resin materials such as fiber reinforced resins, plastics, ceramics and the like. In one embodiment, plate 212 has a thickness 214 of about 0.150 inches (about 3.8 mm) which is substantially thicker than a typical PCB (which typically have a thickness of approximately 0.06 inches or about 1.5 mm). Although it would be possible to provide plates 212 having relatively greater thicknesses, it is preferred to use a plate 212 which is substantially as thin as feasible (while providing desired rigidity and accommodation for GBIC feet or other mounting structures). In this regard, it is useful to provide for frame feet which are off-set from one another, e.g. in longitudinal directions (such as with respect to lateral lines 144, 146, 148 as described) since this permits use of more than half the thickness 214, of the plate 212 for accommodating the feet of a GBIC frame coupled to one surface 216 without creating interference with respect to the feet from a GBIC frame coupled to opposite surface 218. For example, if the frame 112 of FIG. 1 is coupled to the upper surface 216 of the plate 212 of FIG. 2, foot 132c can protrude a distance 134c which may exceed one-half the plate thickness 214, though an opening 222, preferably with an aligned cut-out 224 to accommodate an outwardly projecting tooth 152 of foot 132c (FIG. 3). This attachment does not, however, create interference with respect to a GBIC frame attached to the lower surface 218 since the closest foot, to opening 222 for such a second frame would be foot 132d which, as described above, is off-set in a rearward direction 142d with respect to the position of foot 132c and accordingly can be accommodated in the rearwardly positioned opening 226 of the plate 212 (continuous with opening 222 in the depicted embodiment) and the tooth 154 of foot 132d' of the second GBIC 112' (FIG. 3) can be accommodated in a second cut-out 228. Similar off-set configurations with respect to holes 232a, 232b, 232c, 232f accommodate, in a non-interfering manner, remaining feet of both a first GBIC frame 112 and a second GBIC frame 112', as shown generally in FIG. 3. In this fashion, longitudinally off-set openings as depicted in FIG. 2 provide for back-to-back coupling of two GBIC frames to a relatively thin plate such as, e.g., a plate having a thickness 214 of about 0.15 inches (about 4 mm) and transverse (i.e. perpendicular to plane 122) length 312 of about 0.75 inches (about 2 cm).

Figure 2:
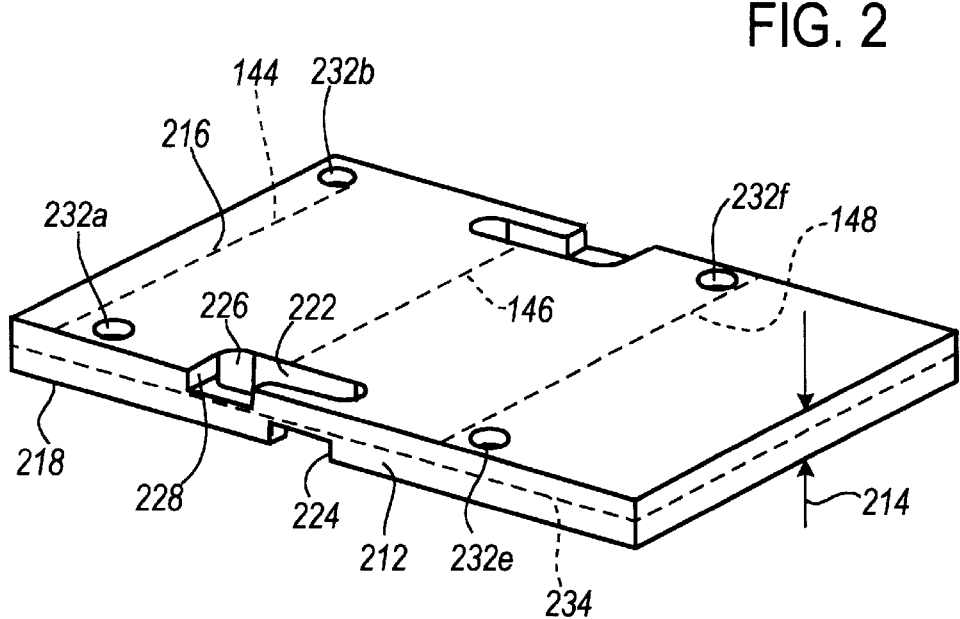
FIG. 2 is a perspective view of a frame attachment plate according to an embodiment of the present invention.
Figure 3:
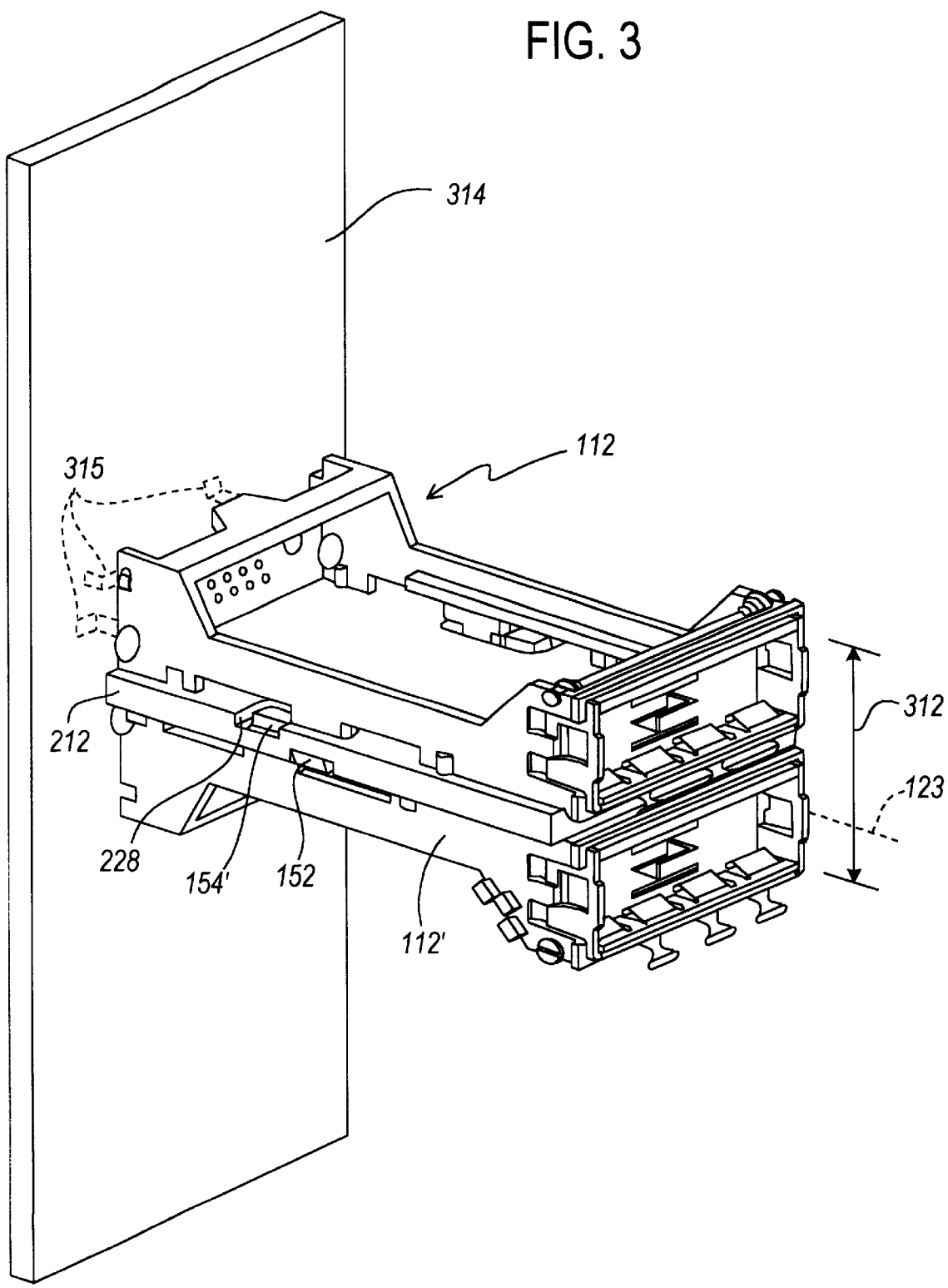
FIG. 3 is a perspective view of two coupled GBIC frames adjacent a PCB according to an embodiment of the present invention.

One feature of the configuration of the plate of FIG. 2 is that the plate is preferably symmetric about its mid-plane 234 in the sense that, when assembling a particular frame 112 to the plate 212, it does not matter which surface 216 or 218 is uppermost, since the openings 222, 226, 232a,b,e,f will appear identical when either side is uppermost. This simplifies manufacture since during assembly it is not necessary to couple a particular frame configuration to a particular side. Similarly this means that the frames 112, 112' coupled to opposite sides of the plate 212 can be have identical configurations, i.e. it is not necessary, during assembly, to select between frame configurations, with one frame configuration to be coupled to one side of the plate and the other plane configuration be coupled to the other side of the plate.

In the embodiment of FIG. 3, the back-to-back coupled GBIC frames, can be coupled to a PCB 314, e.g. by mounting the plate 212 with respect to the board 314. Preferably, edges of the GBIC frames are also mounted to the PCB 314 e.g. using mounting tabs 315 to provide additional stability and reduce relative motion. In addition to, or in place of, tabs 315, mounting or coupling can be achieved or enhanced by any conventional means, including by adhesive, soldering or welding, using brackets, tracks, or other mounting components and the like.

Figure 4:
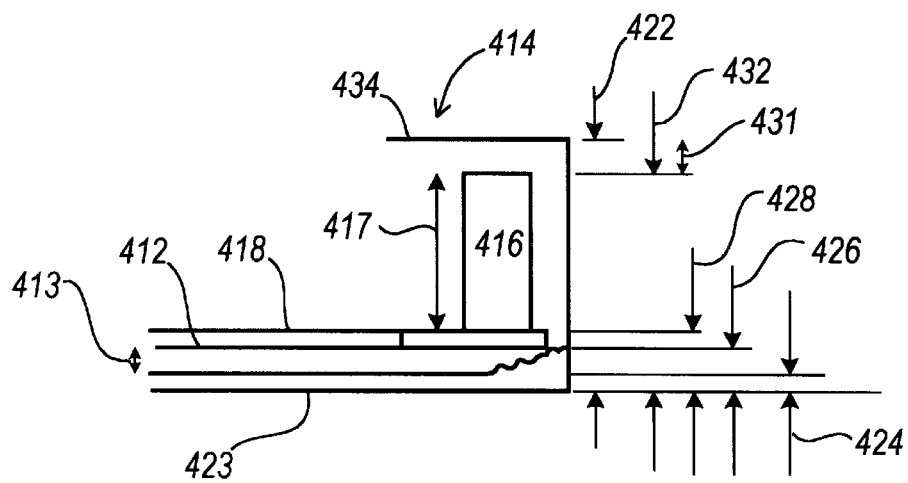
FIG. 4 is a schematic front elevational view, partially broken away, illustrating certain height relationships of a GBIC, PCB and chassis.
Figure 5:
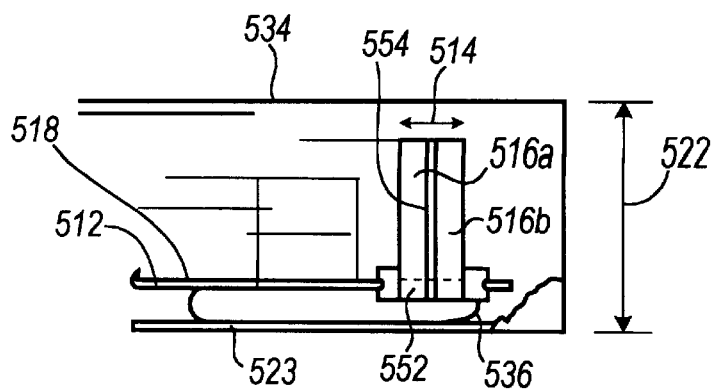
FIG. 5 is a front elevational view, partially broken away, of a chassis having a PCB and a GBIC showing certain height relationships, according to one embodiment of the present invention.
Figure 8:
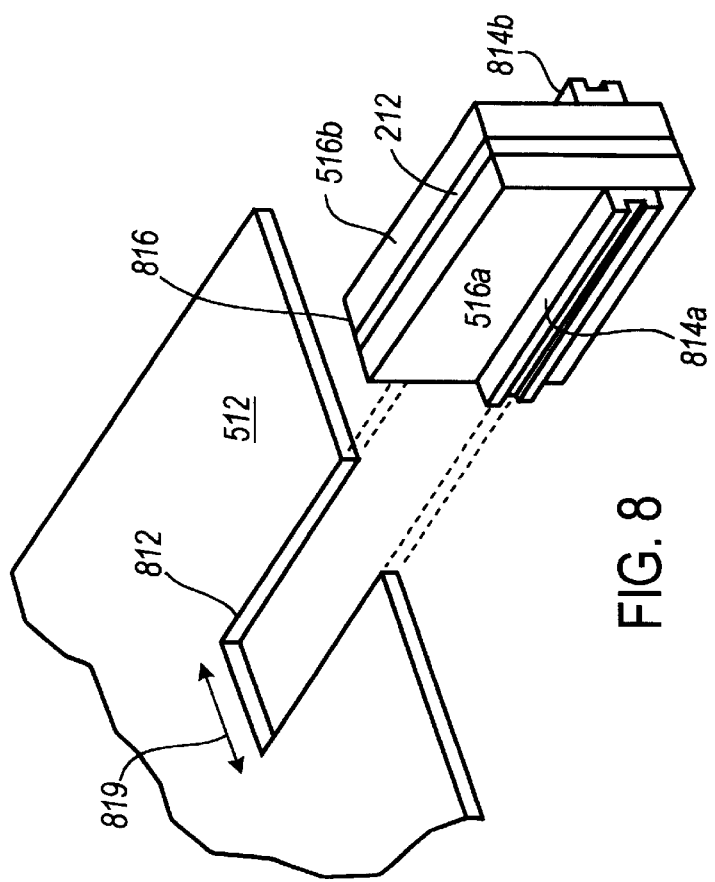
FIG. 8 is a perspective view of the device of FIG. 7.

In the configuration of FIG. 3, the longitudinal axis 123 of the GBICs are substantially perpendicular to the PCB 314. In other configurations, it is preferred to mount GBICs with respect to a PCB such that the longitudinal axis 123 is parallel to the PCB. One possible approach is depicted in FIG. 4 in which a motherboard or other PCB 412 extends along the long axis of a chassis 414, e.g. of a network router or similar device. In the embodiment of FIG. 4, a GBIC and frame 416 is mounted with a sidewall flush on the upper major surface 418 of the PCB 412. (GBICs and frames in FIGS. 4, 5, and 8 are depicted as parallelepipeds, for simplicity.) In the configuration of FIG. 4, the entire vertical extent of the device 422 must take into account a number of items. In the embodiment of FIG. 4, the lower wall or plate of the chassis occupies a certain thickness 424 such as, for example, 0.4 inches (about 10 mm) (not to scale in FIG. 4). A certain clearance 413 is provided between the bottom plate 423 and the PCB 412, such as about 0.25 inches (about 6 mm), to provide an accumulated distance 426 of 0.29 inches (about 7 mm). The thickness of the PCB 412 adds a further amount such as about 0.06 inches (about 1.5 mm) to bring the accumulated thickness 428 to 0.35 inches (about 9 mm). The GBIC 416 (including an allowance for the thickness of the GBIC frame) adds an additional height 417 of about 1.24 inches (about 36 mm) to bring the accumulated height 432 to about 1.69 inches (about 43 mm). Finally, a clearance or airspace between the GBIC 416 and the upper wall or plate 434 in the amount 431 of about ⅛ inch (about 3 mm) brings the total height of the device 422 to 1.815 inches (about 46 mm). As noted above, the 1RU standard height is 1.75 inches (about 44.5 mm) and thus the configuration of FIG. 4, if the clearances depicted are observed, cannot be accommodated in a 1RU form factor device.

FIG. 5 depicts an embodiment which provides for mounting one or more GBICs in an upright configuration, with the long axis of the opening 138 perpendicular to the plane of the board 412. (The embodiment of FIG. 5 provides for relatively small lateral extent 514 of the GBICs 516a, 516b while still accommodating the device in an 1RU form factor having a height 522 of about 1.75 inches (about 44.5 cm), preferably while still providing clearance between the lower plate 523 and the bottom of the GBICs 516a,b and between the upper plate 530 and the upper surface of the GBICs 516a,b of at least ⅛th inch (about 3 mm). In one embodiment, as depicted in FIG. 8, the PCB 512 is provided with a cut-out 812 sufficient to accommodate one or more GBICs, preferably sufficient to accommodate first and second GBICs 516a, 516b and frames mounted back-to-back on a plate 212 as well as to accommodate portions of first and second rails 814a,b which are mounted on the GBIC frames 516a, 516b. As depicted in FIG. 5, using this construction, a certain portion 552 of the GBICs 516a, 516b (and frames) extend below the upper surface 518 of the PCB 512 with the remaining portion 554 extending above the upper surface 518 of the PCB 512. In this way, it is not necessary for the chassis to have a height 522 sufficient to accommodate the accumulated height of the GBIC plus the thickness of the PCB 412 (and other items). Instead, the height 522 need only accommodate the height of the GBICs (and frames) 516a, 516b plus clearances above and below the GBIC (and chassis walls). It may be possible to provide relatively little clearance 536 between the GBICs 516a, b and the chassis bottom 525, such as less than about ⅛ inch (about 3 mm). Further, in one embodiment, the region of the chassis bottom 523 adjacent the GBIC frames is "scooped out" to provide a thinned chassis wall and achieve desired clearance.

Figure 6:
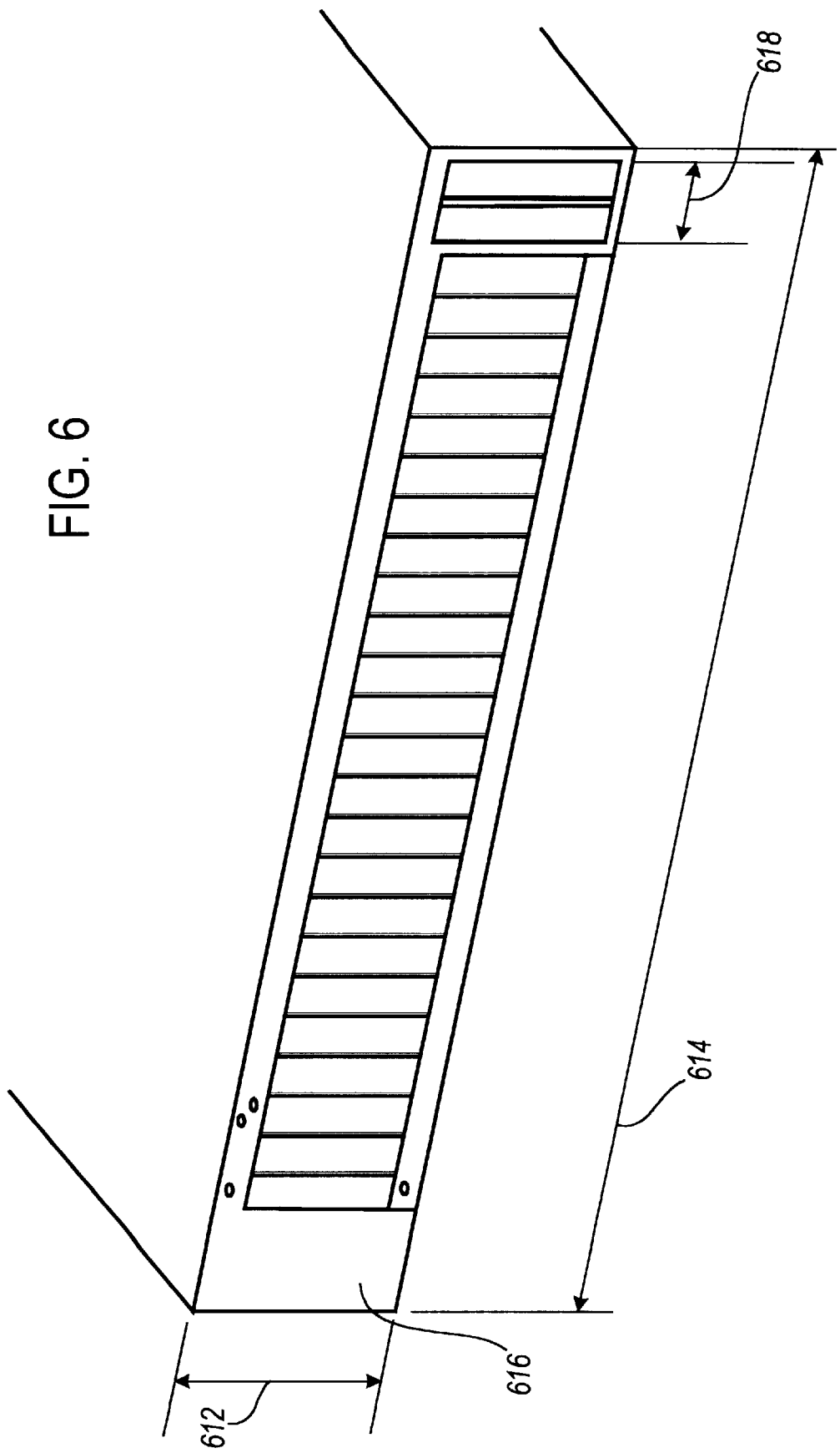
FIG. 6 is a perspective view of an RU form factor device with GBICs mounted according to an embodiment of the present invention.

FIG. 6 is a perspective view of a network router showing the front plate thereof. The depicted device complies with RU form factors by having a height 612 of 1.75 inches (about 44.5 mm) and a width 614 of 17.5 inches (about 450 mm). By using a configuration similar to that depicted in FIG. 5, GBIC front faces can be accommodated in the front plate 616 of the device in a space-efficient manner by positioning with the long axis of the GBIC faces in the direction of the 1.75 inch (about 44.5 mm). height of the device, thus occupying relatively little width such as providing for two back-to-back mounted GBICs occupying a width 618 of about 1⅜ inch (about 35 mm).

Figure 7:
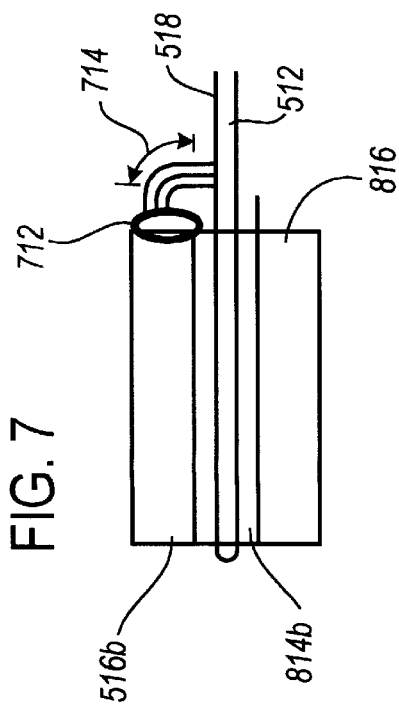
FIG. 7 is a side view of a GBIC and PCB according to an embodiment of the present invention.

As depicted in FIG. 7, in one configuration, a GBIC 516*b* communicates with components (such as a SerDes chip) on the PCB 512 via a connector 712 which includes a wire, cable or flexible link path. By positioning the back end 816 of the GBIC 516*b* near the SerDes, (as can be done when the GBIC 516*b* is coupled, e.g. by rail 814*b* to an edge or recess of the PCB 512), the length 714 of the signal path (which is typically a high frequency serial signal, e.g. of, e.g. 1.25 Ghz) can be relatively short such as less than about two inches (about 50 mm), preferably less than about 1 inch (about 25 mm). The (typically parallel) signals output by the SerDes chip are lower frequency signals e.g. 10-bit, 125 MHZ signals, where the length of the signal path is of less concern.

Figure 9:
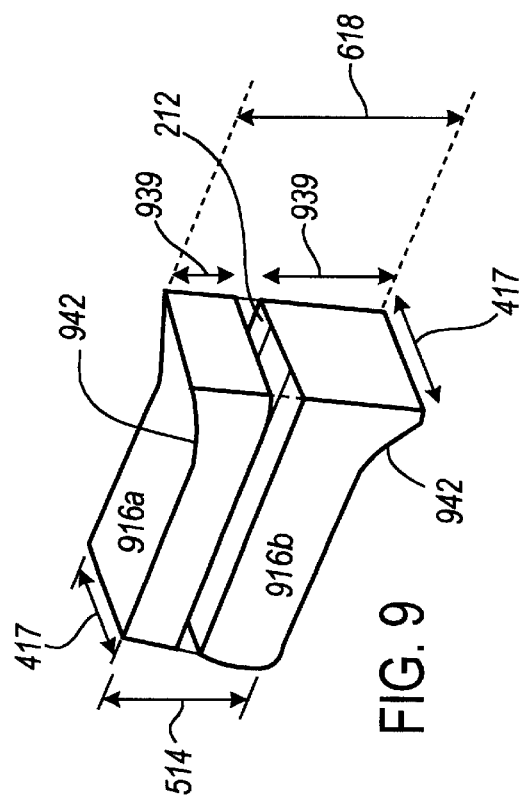
FIG. 9 is a perspective view of a tapered GBIC pair according to an embodiment of the present invention.

In the configuration of FIG. 8, the surface area of the PCB which must be cut-out (and is thus unavailable for positioning circuitry), has a width 819 at least equal to the transverse dimension 312 of two stacked GBICs (and frames) plus an allowance for the rails 814*a,b*. In the configuration of FIG. 9, the GBICs, while having the standard GBIC frame (double) height 514 and width 417, provides for more forward portions of the GBICs (and frame) in a flared configuration 942, so that the configuration of FIG. 9 can be accommodated by a PCB slot which, at least in the rearmost portion of the PCB slot, can have a width commensurate with the above-described stacked-GBIC width 514 while the openings of the GBICs can have heights 939 larger than those in the embodiment of FIG. 3. The configuration of FIG. 9 will receive first and second differently shaped (mirror image) GBICs.

In light of the above description, a number of advantages of the present invention can be seen. The present invention permits two or more GBICs, and GBIC frames, to be mounted in relatively close proximity in substantially parallel fashion, preferably in substantially back-to-back configuration. The present invention facilitates mounting of GBICs in a fashion to promote space efficiency, c.g. by reducing the lateral and/or vertical extent required for a given number of GBICs, e.g. GBIC faces accessible on a face panel. The present invention facilitates providing a relatively large, preferably maximal, number of GBICs within a 1RU form factor. The present invention provides for mounting of GBICs and GBIC frames with respect to a PCB in a secure and stable manner. The present invention facilitates mounting GBICs in close proximity to components such as a serializer/deserializer, e.g. to provide for relatively short high-frequency signal paths.

A number of variations and modifications of the invention can be used. It is possible to use some aspects of the invention without using others. For example, it is possible to provide a plate for back-to-back mounting of two GBIC frames without mounting frames to extend on opposite sides of (or straddle) a PCB (and vice versa). Although embodiments of the present invention have been described in coiLmection with accommodating a 1RU form factor, the present invention can also be used to accommodate other form factors. Although the present invention has been described in connection with GBIC connectors used for routers, the present invention can also be used for devises where GBIC connectors are used for other purposes such as network switches, bridges and the like. The present invention can be used for accomodating devices other than GBIC connectors, such as components of a repeater or similar system, and/or non-GBIC connectors. Although an embodiment has been described in which a separate plate 212 is provided, to which two GBIC frames are mounted in back-to-back fashion, it is also possible to provide a single GBIC frame which can accommodate two GBICs in back-to-back fashion, as a unitary piece, or to provide one or both of the GBIC frames formed integrally (as a single piece) with a plate.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. Apparatus for facilitating the mounting of GBICs comprising:
   first and second GBIC frames, each having a plurality of mounting components, and each having a frame face;
   a plate, defining a plate plane, having first and second opposite surfaces, each of said first and second opposite surfaces configured to accommodate said plurality of mounting components of said first and second GBIC frames, respectively, wherein said first and second GBIC frames are positioned in parallel fashion to define first and second frame positions, said frame faces of said first and second GBIC frames being similarly oriented;
   wherein said plate is mounted to a circuit board such that said plate is substantially perpendicular to said circuit board.

2. Apparatus as claimed in claim 1 wherein said frame faces of said first and second GBIC frames are substantially coplanar.

3. Apparatus as claimed in claim 1 wherein said first and second GBIC frames, when positioned in said first and second frame positions, are in mirror-image relationship with respect to one another about a plane substantially parallel to said plate plane.

4. Apparatus as claimed in claim 1 wherein said plate has a first thickness of about 0.15 inches.

5. Apparatus as claimed in claim 1 wherein said plate is mirror symmetric about said plate plane.

6. Apparatus as claimed in claim 1 wherein said circuit board includes at least a first serializer-deserializer mounted on said circuit board such that said serializer-deserializer is less than about 1 inch from at least one of said first and second GBIC frames.

7. Apparatus for facilitating the mounting of GBICs comprising:
- first and second GBIC frames, each having a plurality of mounting components, and each having a frame face;
- coupling means, defining a first plane, having first and second opposite surfaces, each of said first and second opposite surfaces configured to accommodate said plurality of mounting components of said first and second GBIC frames, respectively, wherein said first and second GBIC frames are positioned in parallel fashion to define first and second frame positions, said frame faces of said first and second GBIC frames being similarly oriented;
- wherein said coupling means is mounted to a circuit board such that said first plane is substantially perpendicular to said printed circuit board.

8. Apparatus as claimed in claim 7 wherein said frame faces of said first and second GBIC frames are substantially coplanar.

9. Apparatus as claimed in claim 7 wherein said first and second GBIC frames, when positioned in said first and second frame positions, are in mirror-image relationship with respect to one another about a plane substantially parallel to said first plane.

10. Apparatus as claimed in claim 7 wherein said coupling means has a first thickness of about 0.15 inches.

11. Apparatus as claimed in claim 10 wherein said coupling means is mirror symmetric about said first plane.

12. Apparatus as claimed in claim 7 wherein said circuit board includes at least a first serializer-deserializer mounted on said circuit board such that said serializer-deserializer is less than about 1 inch from at least one of said first and second GBIC frames.

13. A method for facilitating the mounting of GBICs comprising:
- providing first and second GBIC frames, each having a plurality of mounting components, and each having a frame face;
- coupling said first and second GBIC frames to a plate, defining a plate plane, having first and second opposite surfaces, each of said first and second opposite surfaces configured to accommodate said plurality of mounting components of said first and second GBIC frames, respectively, wherein said first and second GBIC frames are positioned in parallel fashion to define first and second frame positions, said frame faces of said first and second GBIC frames being similarly oriented;
- coupling said plate to a circuit board such that said plate is substantially perpendicular to said circuit board.

14. A method as claimed in claim 13 wherein said step of mounting comprises mounting said first and second GBIC frames such that said frame faces of said first and second GBIC frames are substantially coplanar.

15. A method as claimed in claim 13 wherein said step of mounting comprises mounting said first and second GBIC frames such that said first and second frames are in mirror-image relationship with respect to one another about a plane substantially parallel to said plate plane.

16. A method as claimed in claim 13 wherein said plate is mirror symmetric about said plate plane.

17. A method as claimed in claim 13 wherein said circuit board includes at least a first serializer-deserializer mounted on said circuit board and wherein said step of mounting comprises mounting said first and second GBIC frames such that said serializer-deserializer is less than about 1 inch from at least one of said first and second GBIC frames.

18. Apparatus for facilitating the mounting of GBICs comprising:
- first and second GBIC frames, each having a plurality of mounting components, and each having a frame face;
- a plate, defining a plate plane, having first and second opposite surfaces, each of said first and second opposite surfaces configured to accommodate said plurality of mounting components of said first and second GBIC frames, respectively, wherein said first and second GBIC frames arc positioned in parallel fashion to define first and second frame positions, said frame faces of said first and second GBIC frames beino similarly oriented;
- wherein said plate is coupled to a circuit board; and
- a direct mechanical connection between said circuit board and at least one of said first and second GBIC frames.

19. Apparatus for facilitating the mounting of GBICs comprising:
- first and second GBIC frames, each having a plurality of mounting components, and each having a frame face;
- coupling means, defining a first plane, having first and second opposite surfaces, each of said first and second opposite surfaces configured to accommodate said plurality of mounting components of said first and second GBIC frames, respectively, wherein said first and second GBIC frames are positioned in parallel fashion to define first and second frame positions, said frame faces of said first and second GBIC frames being similarly oriented;
- wherein said coupling means is coupled to a circuit board; and
- a direct mechanical connection between said circuit board and at least one of said first and second GBIC frames.

20. A method for facilitating the mounting of GBICs comprising:
- providing first and second GBIC frames, each having a plurality of mounting components, and each having a frame face;
- coupling said first and second GBIC frames to a plate, defining a plate plane, having first and second opposite surfaces, each of said first and second opposite surfaces configured to accommodate said plurality of mounting components of said first and second GBIC frames, respectively, wherein said first and second GBIC frames are positioned in parallel fashion to define first and second frame positions, said frame faces of said first and second GBIC frames being similarly oriented;
- coupling said plate to a circuit board; and
- directly coupling said circuit board to at least one of said first and second GBIC frames.

21. Apparatus for facilitating the mounting of GBICs comprising:
- at least a first GBIC frame, said GBIC frame defining a front face having a face longitudinal axis;
- board attachment means mounted to said GBIC frame;
- a circuit board, defining a perimeter, said circuit board having at least a first edge coupled to said board attachment means, said circuit board having upper and lower major surfaces, each lying in a plane, wherein said GBIC frame straddles at least one of said upper and lower major surfaces such that first and second different portions of said GBIC frame are positioned on opposite sides of the plane of said one of said upper and lower major surfaces wherein said first edge is an edge of a cut-out extending inwardly from the perimeter of said circuit board; and wherein said cut-out has a first width at an inward extension of said cutout and wherein said GBIC frame has a flared shape such that a forward portion of said GBIC frame has a height exceeding said cut-out width.

22. Apparatus as claimed in claim 21 wherein said one of said upper circuit board major surface and said lower circuit board major surface lies within a substantially rectangular envelope and said first edge comprises an edge of said rectangular envelope.

23. Apparatus as claimed in claim 21 wherein said first edge is an edge of a cut-out extending inwardly from the perimeter of said circuit board.

24. Apparatus for facilitating the mounting of GBICs comprising:

least a first GBIC frame, said GBIC frame defining a front face having a face longitudinal axis;

at least a first rail mounted to said GBIC frame;

a circuit board, defining a perimeter, said circuit board having at least a first edge coupled to said first rail, said circuit board having upper and lower major surfaces, each lying in a plane, wherein said GBIC frame straddles at least one of said upper and lower major surfaces such that first and second different portions of said GBIC frame are positioned on opposite sides of the plane of said one of said upper and lower major surfaces;

wherein said first edge is an edge of a cut-out extending inwardly from the perimeter of said circuit board; and wherein said cut-out has a first width at an inward extension of said cutout and wherein said GBIC frame has a flared shape such that a forward portion of said GBIC frame has a height exceeding said cut-out width.

25. Apparatus as claimed in claim 24 wherein said one of said upper circuit board major surface and said lower circuit board major surface lies within a substantially rectangular envelope and said first edge comprises an edge of said rectangular envelope.

26. Apparatus as claimed in claim 24 wherein said first edge is an edge of a cut-out extending inwardly from the perimeter of said circuit board.

27. A method for facilitating the mounting of GBICs comprising:

providing at least a first GBIC frame, said GBIC frame defining a front face having a face longitudinal axis;

mounting a board attachment device on said GBIC frame;

coupling a first edge of a circuit board to said board attachment means, said circuit board defining a perimeter, said circuit board having upper and lower major surfaces, each lying in a plane, wherein said GBIC frame straddles at least one of said upper and lower major surfaces such that first and second different portions of said GBIC frame are positioned on opposite sides of the plane of said one of said upper and lower major surfaces;

wherein said first edge is an edge of a cut-out extending inwardly from the perimeter of said circuit board; and wherein said cut-out has a first width at an inward extension of said cutout and wherein said GBIC frame has a flared shape such that a forward portion of said GBIC frame has a height exceeding said cut-out width.

28. A method as claimed in claim 27 wherein said one of said upper circuit board major surface and said lower circuit board major surface lies within a substantially rectangular envelope and said first edge comprises an edge of said rectangular envelope.

29. A method as claimed in claim 27 wherein said first edge is an edge of a cut-out extending inwardly from the perimeter of said circuit board.

30. Apparatus for facilitating the mounting of GBICs comprising:

at least a first GBIC frame, said GBIC frame defining a front face having a face longitudinal axis;

a plate mounted to said GBIC frame a circuit board coupled to said plate; and a GBIC received in said GBIC frame, wherein said GBIC has a flared shape such that a forward portion of said GBIC has a height exceeding a rearward portion of said GBIC.

31. A method for facilitating the mounting of GBICs comprising:

providing at least a first GBIC frame, said GBIC frame defining a front face having a face longitudinal axis;

mounting a board attachment device on said GBIC frame;

coupling a circuit board to said board attachment device; and receiving a GBIC in said GBIC frame, wherein said GBIC has a flared shape such that a forward portion of said GBIC has a height exceeding a rearward portion of said GBIC.

32. Apparatus for facilitating the mounting of GBICs comprising:

at least a first GBIC frame, said GBIC frame defining a front face having a face longitudinal axis;

board attachment means mounted to said GBIC frame;

a circuit board coupled to said board attachment means; and a GBIC received in said GBIC frame wherein said GBIC has a flared shape such that a forward portion of said GBIC has a height exceeding a rearward portion of said GBIC.

* * * * *